United States Patent

Pauley

[15] 3,643,501
[45] Feb. 22, 1972

[54] WRENCHING SYSTEM AND METHOD
[72] Inventor: Reginald W. Pauley, Belle Mead, N.J.
[73] Assignee: Ingersoll-Rand Company, New York, N.Y.
[22] Filed: Nov. 18, 1969
[21] Appl. No.: 877,606

[52] U.S. Cl. ...................................... 73/133, 73/139, 73/89
[51] Int. Cl. ........................................................ G01l 5/24
[58] Field of Search ............................... 73/89, 90, 139, 133

[56] References Cited

UNITED STATES PATENTS

| | | | |
|---|---|---|---|
| 2,756,622 | 7/1956 | La Belle | 73/139 X |
| 2,775,886 | 1/1957 | Lathrop et al. | 73/90 |
| 3,368,396 | 2/1968 | Vam Burkled et al. | 73/139 |
| 3,429,179 | 2/1969 | Bowen et al. | 73/133 |
| 3,440,869 | 4/1969 | Hardiman | 73/89 |

Primary Examiner—Charles A. Ruehl
Attorney—Carl R. Horten and David W. Tibbott

[57] ABSTRACT

A wrenching system and method including a wrench for tightening a threaded fastener, measuring the torque placed on the fastener by the wrench, measuring the angle through which the fastener is rotated simultaneously with the measurement of the torque, simultaneously comparing the torque and the rotation angle of the fastener and determining when the rotation angle begins increasing at a nonlinear rate relative to the increase of torque, thereby indicating that the strain on the fastener is exceeding its elastic limit. A signal is created in response to the exceeding of the elastic limit of the fastener, and actuates a shutoff means to stop the wrench.

6 Claims, 4 Drawing Figures

PATENTED FEB 22 1972　　3,643,501

INVENTOR
REGINALD W. PAULEY
BY
David W. Tilbott
ATTORNEY 3,643,501

WRENCHING SYSTEM AND METHOD

BACKGROUND OF INVENTION

This invention relates generally to a system for measuring and controlling the tension on a fastener being tightened and, more particularly, to a wrenching system for applying and controlling the tension in fasteners.

Prior art wrenching systems attempt to control the tension in a fastener in one of two ways: either by measuring the torque placed on the fastener as it is tightened or by counting the number of turns the fastener is tightened and stopping the turning of the fastener after a predetermined number of turns. Either of these methods is relatively unsatisfactory to control the tension in a fastener since both are subject to factors or variables which can prevent the accurate measurement of tension in the fastener. For example, when measuring the torque load on the fastener, the torque load may not relate accurately to the tension in the fastener since the torque load is effected by the friction of the fastener against the work surface as it is being rotated. One reason why the turn-of-the-nut system is inaccurate is because individual fasteners vary from each other which can result in one fastener being under a different tension than another, although both might be rotated the same number of turns while being tightened.

SUMMARY OF THE INVENTION

The principal object of this invention is to provide an apparatus and a method for tightening a fastener and simultaneously measuring the stress-strain relationship in the fastener and determining when the fastener reaches its elastic limit.

Other important objects of this invention are: to provide an apparatus for wrenching a fastener and simultaneously determining its stress-strain relationship and automatically stopping the wrenching of the fastener when the elastic limit of the fastener is exceeded; to provide a novel tension controlling system for a fastener; to provide a fastener tension controlling system which can be used on various types of fasteners without adjustment to determine when the fastener exceeds its elastic limit and for terminating the tightening of the fastener in response to the exceeding of the elastic limit.

In general, the foregoing objects are attained in an apparatus and method including means for tightening a fastener such as a wrench, measuring the torque placed on the fastener by the wrench as it is being tightened; measuring the angle through which the fastener is rotated while being tightened; simultaneously comparing the torque and the rotation angle of the fastener and determining when the rotation angle begins increasing at a nonlinear rate relative to the increase of torque thereby indicating the exceeding of the elastic limit of the fastener and creating a signal indicating the exceeding of the elastic limit of the fastener which can be used to either signal the operator to discontinue the wrenching operation or for actuating a shutoff system for the wrench to automatically stop the wrench.

BRIEF DESCRIPTION OF DRAWING

The invention is described in connection with the drawing wherein.

DESCRIPTION OF PREFERRED EMBODIMENT

Figure 1:
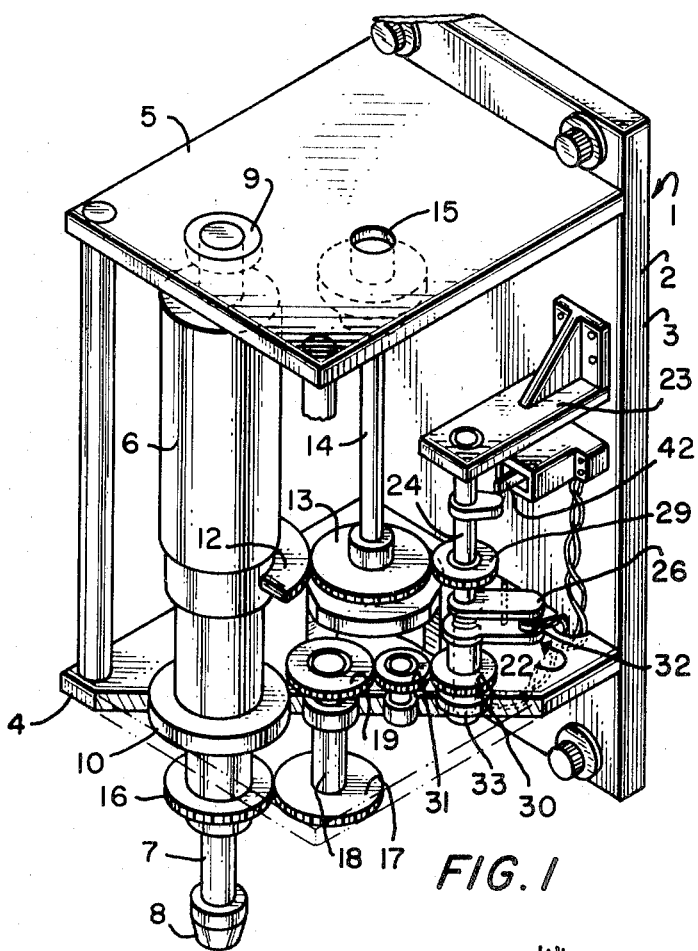
FIG. 1 is a perspective view of one embodiment of apparatus incorporating the principles of the invention.

The wrenching apparatus 1 shown in FIG. 1 includes a frame 2 comprising a vertical rear plate 3, a horizontal base 4 attached to the lower portion of the rear plate 3 and projecting therefrom and a horizontal top 5 attached to the upper portion of the rear plate 3 and overlying the base 4 in spaced relationship. A power wrench 6 is rotatably mounted between the base 4 and top 5 and journaled in both of these members so that it is free to rotate on its mountings. The wrench 6 includes a spindle 7 extending below the base 4 and carrying on its lower end a fastener driving socket 8. The upper end of the wrench 6 is rotatably mounted in a bearing 9, shown in dotted lines in FIG. 1, and the lower end of the casing of the wrench 6 includes a journal 10, also shown in dotted lines in FIG. 1, rotatably mounted in a corresponding opening in the base 4. It is emphasized that the casing of the wrench 6 is free to rotate in the frame 2 under reaction forces.

In order to prevent the wrench 6 from rotating freely from reaction forces during the driving of a fastener, it includes a semiarcuate gear sector 12 anchored to its outer casing and engaging a gear 13 fixed on the lower end of a torsion bar 14 having its upper end fixedly anchored in the top 5 by an anchor 15, indicated in dotted lines in FIG. 1. The torsion bar 14 is designed with sufficient flexibility to allow the wrench 6 to rotate through a calibrated angle in response to a predetermined torque load as it tightens a fastener. As such rotation takes place, the gear 13 will turn through a corresponding angle. The rotation of the gear 13 is directly proportional to the torque load on a fastener as it is being tightened by the wrench 6. This fact is well known to all who understand the laws of reaction forces and is not believed to require further explanation here.

Means is provided for measuring the angle through which the spindle 7 rotates as a fastener is tightened. The spindle 7 carries a gear 16 attached thereto which engagedly drives an intermediate gear 17 mounted on the lower end of a shaft 18 rotatably mounted in the base 4. The upper end of the shaft 18 carries a second intermediate gear 19. As a result of being geared together, the gears 16 and 17 will rotate with the rotation of the spindle 7.

Means is provided for simultaneously comparing the torque load on the wrench 6 and the angle through which the spindle 7 rotates and indicating when a difference in movement exists. This means includes a differentiator 22 rotatably mounted between the base 4 and an intermediate bracket 23 attached to the rear plate 3 and overlying the rear base 4. The differentiator 22 includes a shaft 24 journaled in both the bracket 23 and the base 4.

The shaft 24 includes a pinion 29 engageably geared to the torsion bar gear 13. As the torsion bar gear 13 rotates, the pinion 29 and the shaft 24 will rotate through a corresponding angle. The shaft 24 carries an upper arm 26 which rotates with the shaft 24 through the same angle.

An idler pinion 30 is rotatably mounted on a sleeve 25 rotating on the shaft 24 and geared to an intermediate gear 19. As a result of being geared together, the rotation of the second intermediate gear 19 simultaneously rotates the intermediate idler gear 31 and the idler pinion 30 through corresponding angles. The sleeve 25 carries a lower arm 32 which is spaced from the upper arm 26 and is interconnected to the idler pinion 30 by an electrical clutch 33. When deenergized, the clutch 33 allows the idler pinion 30 to rotate freely on the sleeve 25 without moving the lower arm 32. However, when the clutch 33 is energized, the idler pinion 30 forces the lower arm 32 to move with it.

A switch 27 is mounted on the lower arm 32 and is normally closed when the upper and lower arms 26 and 32 overlie each other, as shown in FIG. 1, the switch 27 will open when the lower arm 32 moved away from the upper arm 26.

Figure 3:
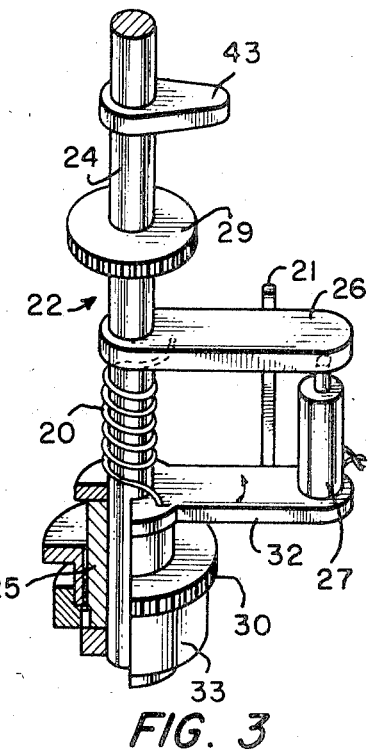
FIG. 3 is an enlarged fragmentary elevation of the differentiator portion of the apparatus.

As arranged in FIG. 3, the lower arm 32 will move counterclockwise relative to the upper arm 26 when the fastener begins to yield. A simple coil spring 20 is shown urging the lower arm 32 in a clockwise direction and a finger 21 is carried by the lower arm 32 and adapted to abut the upper arm 26 to prevent the lower arm 32 from moving clockwise beyond the vertically aligned position of the two arms 26 and 32. The spring 20 returns the lower arm 32 to its starting position when the clutch 33 is deenergized, which generally occurs at the completion of a wrenching operation.

When the clutch 33 is energized to interconnect the lower arm 32 with the idler pinion 30 during the tightening of a fastener, thereafter the rotation of the spindle 7 will drive the lower arm 32 through a corresponding angle and, at the same time, the torque load on the wrench 6 will drive the shaft 24 through a corresponding angle. So long as the rotation angles of the upper and lower shaft portions 24 and 25 remain the same, there will not be any difference measured by the differentiator 22; however, if the rotation of the spindle 7 should proceed at an increased rate relative to the rise of torque on the fastener, the lower arm 32 will move away from the upper arm 26 and the switch 27 will open, thereby creating a signal. Generally, this will happen when the stress-strain relationship in a fastener rises beyond the yield point of the fastener as shown on the stress-strain curve in FIG. 4. This will be explained in more detail later.

Figure 2:
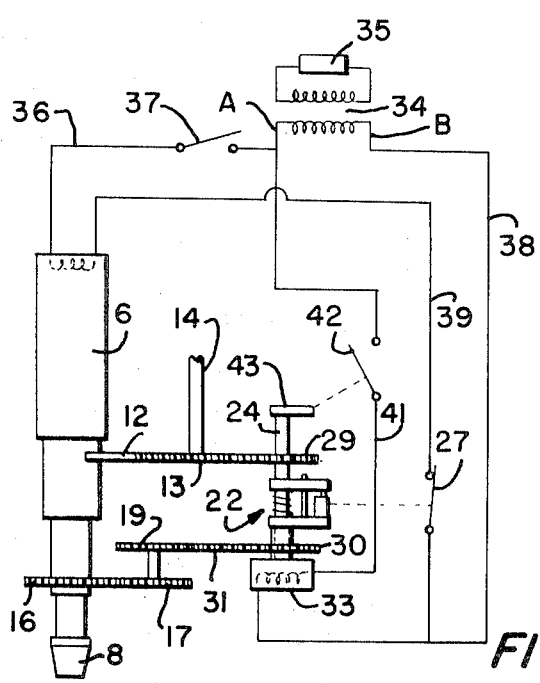
FIG. 2 is a diagrammatic view and electrical schematic illustrating the operating principles of FIG. 1.

Looking at FIG. 2, the wrench 6 is shown as being electrically driven from a transformer 34 operated by an electrical supply 35. A line 36 extends from one side, indicated by the letter "A," of the transformer 34 to the wrench 6 and includes a manually operated starting switch 37. The other side, the "B" side, of the transformer is connected to a line 38 which extends to one side of the clutch 33 and also to a line 39 connected to the wrench 6 and which includes the cutoff switch 27. The switch 27 is normally closed; hence, the closing of the manual switch 37 by an operator starts the wrenching motor 6 to operating.

The other side of the clutch 33 is connected by a line 41 to the A side of the transformer 34 and includes a normally open switch 42. The switch 42 is operated by a cam 43 fixed on the shaft 24. The cam 43 is adapted to close the switch 42 when the torque load reaches a predetermined value during the tightening of a fastener. The switch 42 generally will be closed after the torque load is high enough so that the stress-strain relationship on the fastener being tightened lies in the linear portion of the stress-strain curve. Generally, this operation can be illustrated by looking at the curve in FIG. 4.

Figure 4:
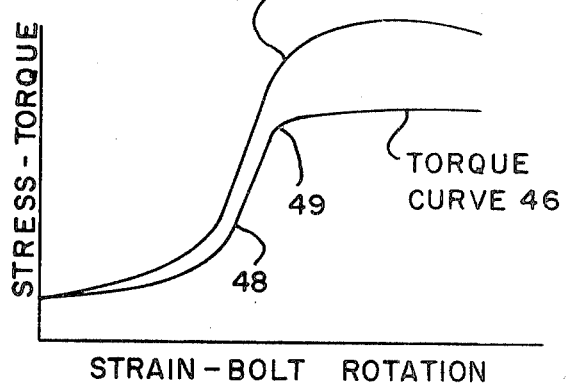
FIG. 4 is a curve illustrating the operation of the invention with the vertical ordinate indicating both torque and tension and the horizontal coordinate indicating strain and bolt rotation.

FIG. 4 shows two curves; one is a tension curve and the other a torque curve on a fastener being tightened. The tension curve 45 is the usual stress-strain curve well known to students of the art of "strength of materials." The vertical coordinate of this curve 45 indicates stress or tension and the horizontal coordinate indicates strain. The torque curve 46 corresponds generally to the shape of the tension curve 45 although it indicates the vertical coordinate of torque and the horizontal coordinate of bolt rotation. FIG. 4 illustrates that both curves 45 and 46 contain linear portions intermediate of nonlinear portions at both ends of each curve. Looking at the torque curve 46, the switch 42 should be closed energizing the clutch 33 when the torque rises to the point generally indicated by the number 48. At this point, the stress-strain or torque-bolt rotation relationship is rising at a linear rate and will continue to do so until the curve reaches the knee 49 at the upper end of the linear portion of the curve 46. After the torque-bolt rotation relationship passes beyond the knee 49, the bolt rotation will begin increasing at a nonlinear rate, a much increased rate, in proportion to the increase of torque. As soon as this happens, the differentiator 22 will cause the switch 27 to open, thereby deenergizing the wrench 6. As a result, at this time the stress-strain or torque-bolt rotation relationship in the fastener will be in its yield range just above the knee 49 of the curve 46 wherein the bolt tightening process is complete. It will be recognized that the wrenching operation can be stopped at either the point where the fastener begins yielding (immediately following the knee 49 in torque curve 46) or at some point measured from the beginning of yield. For example, it might be desirable to stop the wrenching operation at a predetermined stress near the ultimate strength of the fastener. This type of operation can be performed with the apparatus of this invention.

Although a single embodiment of the invention is illustrated and described in detail, it should be understood that the invention is not limited merely to this embodiment, but contemplates other embodiments in variation which utilize the concepts and techniques and are contained within the scope of the following claims.

I claim:

1. A wrenching system for simultaneously tightening a fastener and measuring the stress-strain relationship in the fastener, said system comprising:
   a wrench for tightening a fastener;
   means for measuring the torque placed on the fastener by the wrench;
   means for measuring the angle through which the fastener is rotated;
   means for simultaneously comparing the torque and the rotation angle of the fastener and determining when the rotation angle begins increasing at a nonlinear rate relative to the increase of torque thereby indicating that the strain is exceeding the elastic limit of the fastener; and
   signal means for creating a signal in response to the strain exceeding the elastic limit of the fastener.

2. The wrenching system of claim 1 including:
   means for stopping said wrench in response to the creation of said signal by said signal means.

3. The system of claim 1 including:
   means for automatically activating said means for measuring said angle during a wrenching cycle after the stress-strain relationship on the fastener is increasing at a linear rate.

4. A wrenching method for simultaneously tightening a fastener and measuring the stress-strain relationship in the fastener, said system comprising:
   tightening a fastener;
   measuring the torque on the fastener as it is tightened;
   simultaneously comparing the torque and the rotation angle of the fastener and determining when the rotation angle begins increasing at a nonlinear rate relative to the increase of torque thereby indicating that the strain is exceeding the elastic limit of the fastener; and
   creating a signal in response to the exceeding of the elastic limit of the fastener.

5. The method of claim 4 including:
   the step of stopping the tightening of the fastener in response to said signal.

6. The method of claim 4 wherein:
   the measurement of the fastener rotation angle is delayed during a wrenching operation until the stress-strain relationship on the fastener is increasing at a linear rate.

* * * * *